United States Patent [19]
Hong

[11] Patent Number: 5,567,939
[45] Date of Patent: Oct. 22, 1996

[54] INFRARED SCANNER AND STAND ASSEMBLY

[76] Inventor: Yu-I Hong, P.O. Box 82-144, Taipei, Taiwan

[21] Appl. No.: 574,923

[22] Filed: Dec. 19, 1995

[51] Int. Cl.⁶ .................................................. G01J 5/02
[52] U.S. Cl. ............................... 250/338.1; 250/347
[58] Field of Search .................. 250/338.1, 347, 250/332, 334, 330; 248/180.1, 181.1

[56] References Cited

U.S. PATENT DOCUMENTS

| | | | |
|---|---|---|---|
| 1,780,383 | 11/1930 | Green | 248/180.1 X |
| 2,775,423 | 12/1956 | Strass | 248/180.1 |
| 5,118,945 | 6/1992 | Winschuh et al. | 250/341.6 X |
| 5,313,063 | 5/1994 | Netzer | 250/347 |

*Primary Examiner*—Carolyn E. Fields
*Assistant Examiner*—Edward J. Glick
*Attorney, Agent, or Firm*—Alfred Lei

[57] ABSTRACT

An infrared scanner and stand assembly including a tripod, a scanner holder connected to the head of the tripod by a ball and socket joint to hold an infrared scanner for permitting the infrared scanner to be adjusted horizontally as well as vertically through a 360 degree angle, the scanner holder having two levels mounted on the same plane at right angles for verifying horizontality.

1 Claim, 4 Drawing Sheets

5,567,939

INFRARED SCANNER AND STAND ASSEMBLY

BACKGROUND OF THE INVENTION

1. Field of the Invention

This invention relates to an infrared scanner and stand assembly which comprises a stand and an infrared scanner mounted on the stand at the top by a ball and socket joint.

2. Description of the Prior Art

In building construction, pendulum weight and level are commonly used for measuring verticality and horizontality respectively. However, this measuring method is less precise. Nowadays, various infrared scanners have been developed for measuring verticality as well as horizontality.

SUMMARY OF THE INVENTION

This invention is aimed at providing a stand for holding an infrared scanner which permits the infrared scanner to be conveniently adjusted to the desired angle.

According to the preferred embodiment of the present invention, the infrared scanner and stand assembly comprises a tripod having a head; a ball socket fixedly secured to the head of the tripod by fastening means, the ball socket comprising a plurality of recessed holes evenly distributed over the periphery on the inside, a plurality of spring elements respectively mounted witxin the recessed holes, and a plurality of steel balls respectively mounted in the recessed holes and supported on the spring elements and partially projecting into the space defined within the ball socket; a ball mounted within the ball socket and supported on the steel balls and having a screw hole; a threaded shaft threaded into the screw hole of the ball; a scanner holder mounted on the threaded shaft, the scanner holder comprising an axle bearing connected to the threaded shaft, a first level and a second level disposed at the same plane at right angles, an upright support having an axle hole, a plurality of springs mounted around the periphery of the axle hole of the upright support, and an infrared scanner having a toothed mounting shaft fastened to the axle hole of the upright support.

Other objects of the invention will in part be obvious and in part hereinafter pointed out.

The invention accordingly consists of features of constructions and method, combination of elements, arrangement of parts and steps of the method which will be exemplified in the constructions and method hereinafter disclosed, the scope of the application of which will be indicated in the claims following.

DETAILED DESCRIPTION OF THE PREFERRED EMBODIMENT

Figure 1:
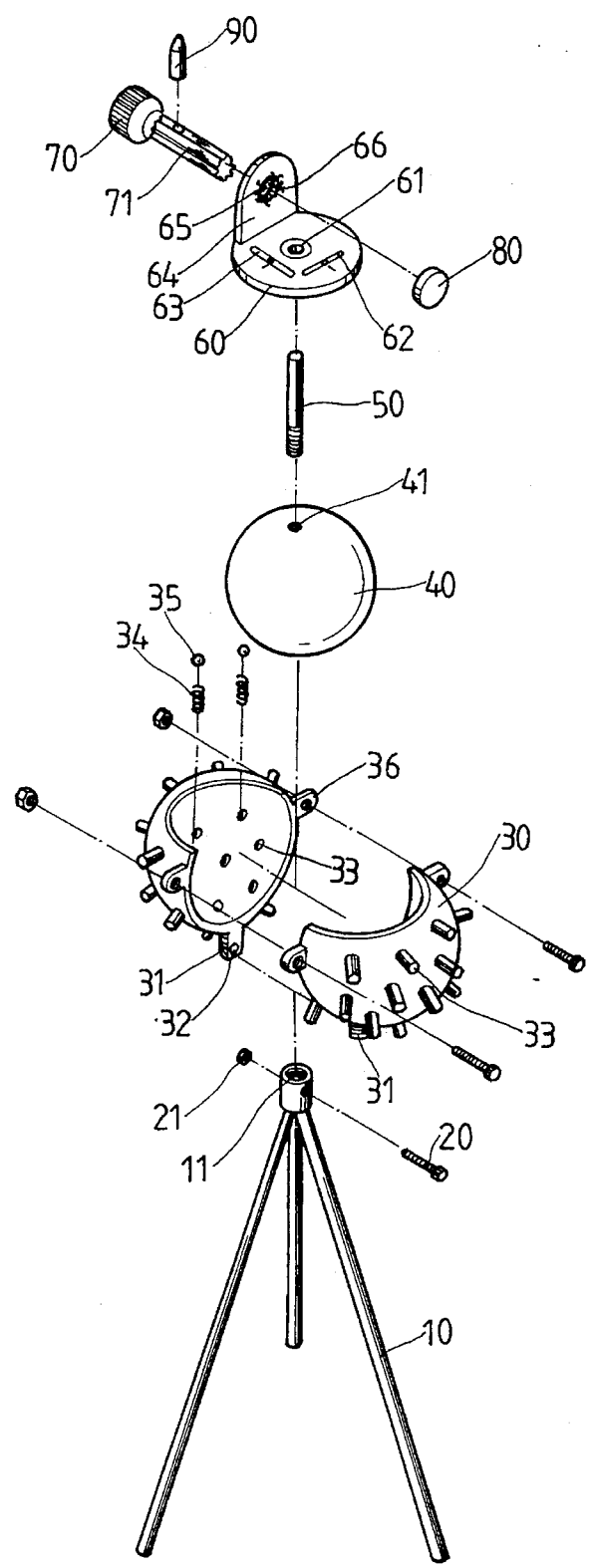
FIG. 1 is an exploded view of an infrared scanner and stand assembly according to the present invention.

For purpose to promoting an understanding of the principles of the invention, reference will now be made to the embodiment illustrated in the drawings. Specific language will be used to describe same. It will, nevertheless, be understood that no limitation of the scope of the invention is thereby intended, such alternations and further modifications in the illustrated device, and such further applications of the principles of the invention as illustrated herein being contemplated as would normally occur to one skilled in the art to which the invention relates.

Figure 2:
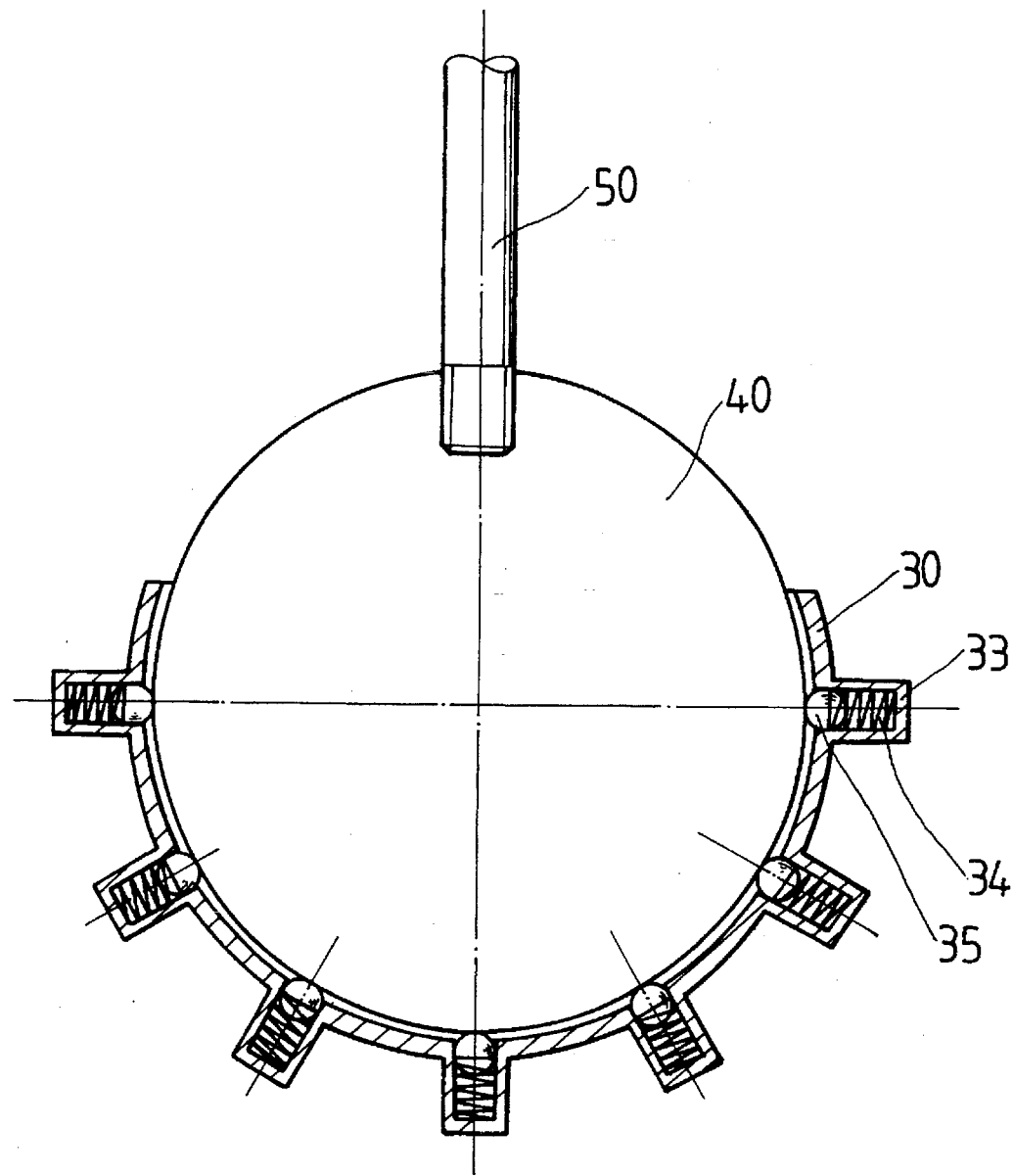
FIG. 2 is a sectional view of the socket and the ball in the socket according to the present invention.

Referring to FIGS. 1 and 2, an infrared scanner and stand assembly in accordance with the present invention is generally comprised of a tripod 10, a ball socket 30, a ball 40, and a scanner holder 60. The ball socket 30 is comprised of two symmetrical halves, which are connected together by fastening respective lugs 36 together by screws. The ball socket 30 comprises a bottom mounting rod 31 and a mounting hole 32 at the bottom mounting rod 31 for connection to the head 11 of the tripod 10 by a screw 20 and a nut 21, and a plurality of recessed holes 33 evenly spaced around the periphery. Each of the recessed holes 33 holds a spring 34 and a steel ball 35. The ball 40 is mounted within the ball socket 30 and retained in position by the steel ball 35 in each recessed hole 33, having a screw hole 41 for mounting the scanner holder 60. The scanner holder 60 comprises an axle bearing 61 connected to the screw hole 41 of the ball 40 by a threaded shaft 50, a first level 62 and a second level 63 disposed at right angles, an upright support 64 having an axle hole 65, a plurality of springs 66 mounted around the periphery of the axle hole 65, and an infrared scanner 70 having a toothed mounting shaft 71 inserted into the axle hole 65 and then covered with a cap 80. When the infrared output socket 90 is mounted on the infrared scanner 70, the assembly is assembled.

Referring to FIG. 2 again, because the ball 40 is mounted within the ball socket 30 and supported on the steel balls 35, which are supported on the respective springs 34, the ball 40 can be rotated within the ball socket 30 by force. When the hand is released from the ball 40 after an adjustment, the ball 40 is firmly retained in position by the steel balls 35.

Figure 3:
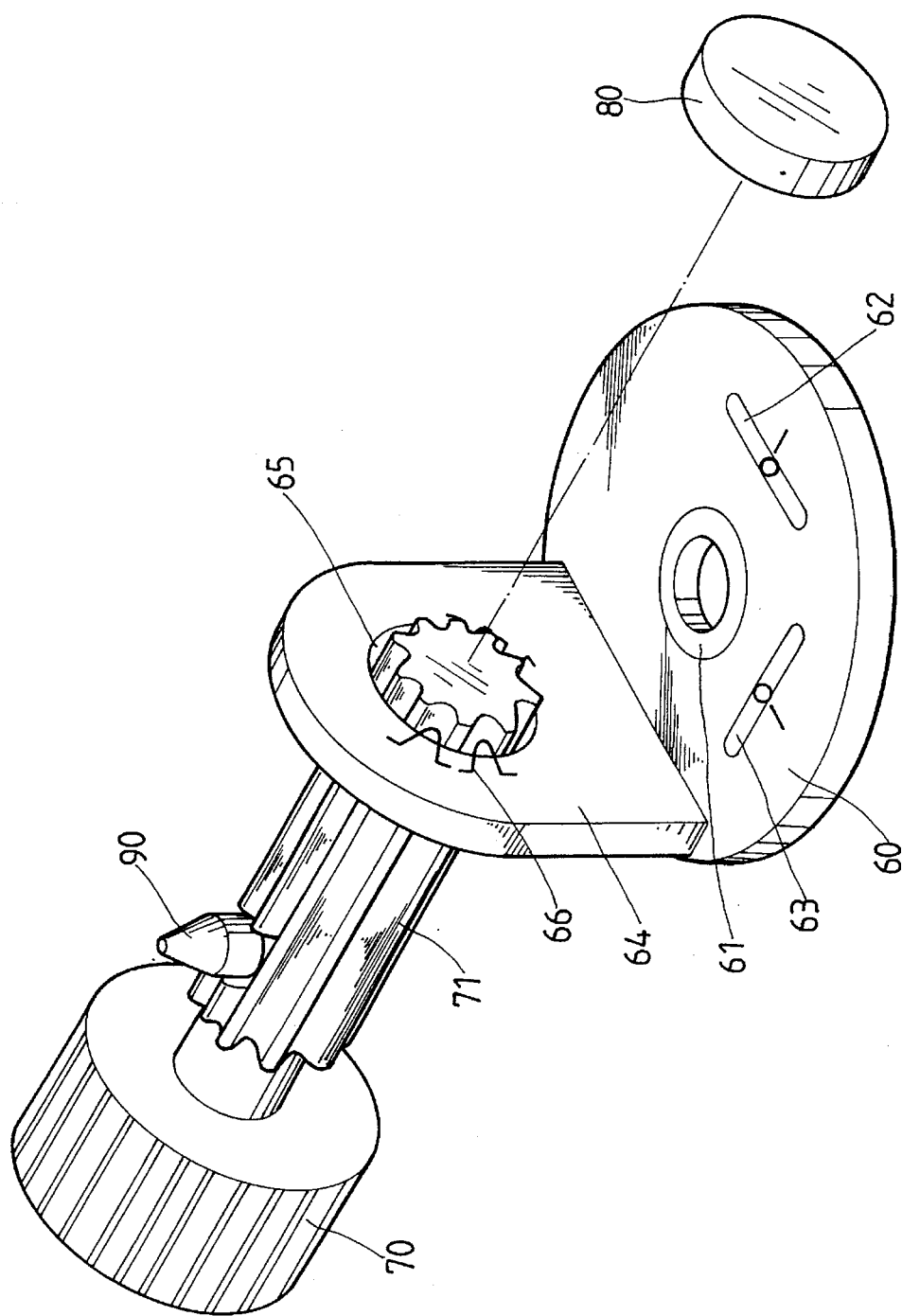
FIG. 3 is an assembly view in an enlarged scale of the scanner holder and the infrared scanner according to the present invention.

Referring to FIG. 3 again, because the axle bearing 61 of the scanner holder 60 is connected to the screw hole 41 of the ball 40 by the threaded shaft 50, the scanner holder 60 can be rotated horizontally. Because the first level 62 and the second level 63 are disposed at the same plane at right angles, they are used to verify the horizontality of the scanner holder 60 when the infrared scanner 70 is used for measuring verticality.

Figure 4:
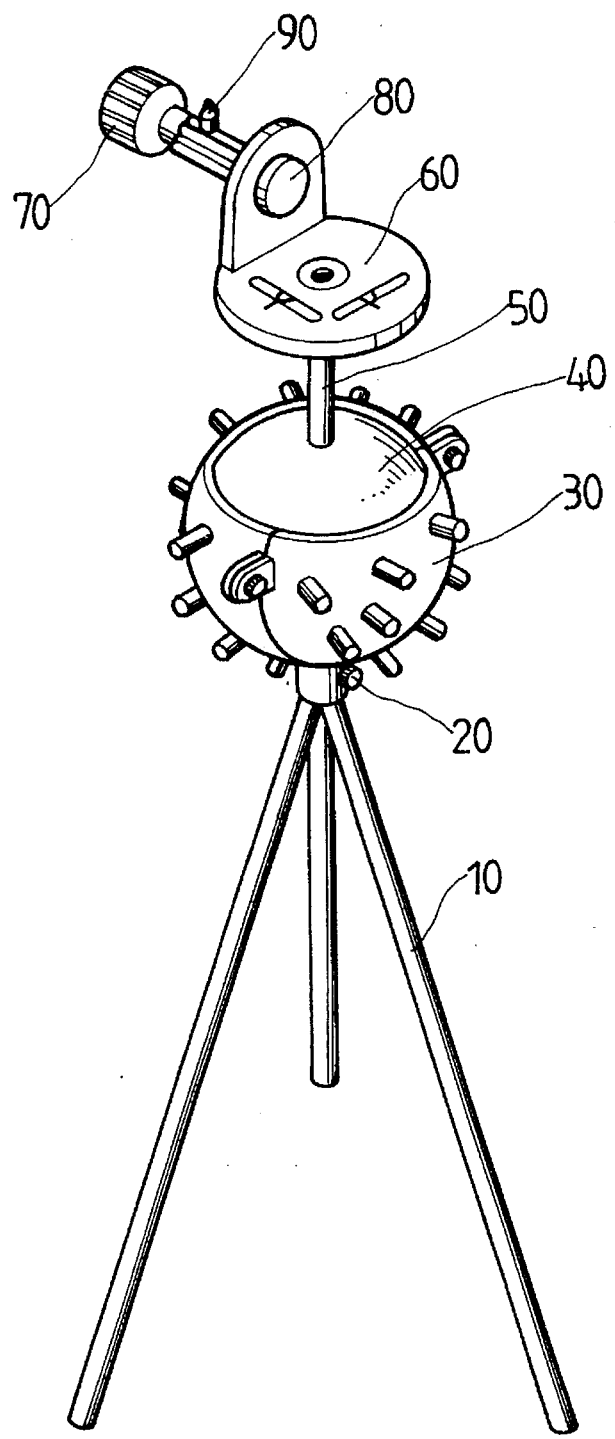
FIG. 4 is an elevational view of the infrared scanner and stand assembly shown in FIG. 1.

Referring to FIG. 4 again, the infrared scanner can be adjusted through for a 360 degree horizontal line scanning as well as a 360 degree vertical line scanning.

It is to be understood that the drawings are designed for purposes of illustration only, and are not intended as a definition of the limits and scope of the invention disclosed.

The invention is naturally not limited in any sense to the particular features specified in the forgoing or to the details of the particular embodiment which has been chosen in order to illustrate the invention. Consideration can be given to all kinds of variants of the particular embodiment which has been described by way of example and of its constituent elements without thereby departing from the scope of the invention. This invention accordingly includes all the means constituting technical equivalents of the means described as well as their combinations.

I claim:

1. An infrared scanner and stand assembly comprising:

a tripod having a head;

a ball socket fixedly secured to the head of said tripod by fastening means, said ball socket comprising a plurality of recessed holes evenly distributed over the periphery on the inside, a plurality of spring elements respectively mounted within said recessed holes, and a plurality of steel balls respectively mounted in said recessed holes and supported on said spring elements and partially projecting into the space defined within said ball socket;

a ball mounted within said ball socket and supported on said steel balls and having a screw hole;

a threaded shaft threaded into the screw hole of said ball;

a scanner holder mounted on said threaded shaft, said scanner holder comprising an axle bearing connected to said threaded shaft, a first level and a second level disposed at the same plane at right angles, an upright support having an axle hole, a plurality of springs mounted around the periphery of the axle hole of said upright support, and an infrared scanner having a toothed mounting shaft fastened to the axle hole of said upright support.

* * * * *